United States Patent [19]

Massengeil et al.

[11] 4,227,803
[45] Oct. 14, 1980

[54] CONTINUOUS COPYING MACHINE

[75] Inventors: Hans A. Massengeil; Georg Böck; Fritz Steinlehner, all of Munich, Fed. Rep. of Germany

[73] Assignee: AGFA-Gevaert, A.G., Leverkusen, Fed. Rep. of Germany

[21] Appl. No.: 78,595

[22] Filed: Sep. 24, 1979

[30] Foreign Application Priority Data

May 10, 1978 [DE] Fed. Rep. of Germany ....... 2843521
May 10, 1978 [DE] Fed. Rep. of Germany ....... 2843522

[51] Int. Cl.$^3$ ...................... G03B 27/48; G03B 27/50
[52] U.S. Cl. ..................................... 355/50; 271/225; 355/354
[58] Field of Search ................... 271/8 R, 3, 1, 4, 225; 355/50, 51, 354

[56] References Cited

U.S. PATENT DOCUMENTS

| 3,743,406 | 7/1973 | Komori et al. | 355/50 X |
| 4,056,320 | 11/1977 | Mochimaru et al. | 355/50 X |
| 4,110,038 | 8/1978 | Irvine et al. | 355/50 |

Primary Examiner—Richard A. Wintercorn
Attorney, Agent, or Firm—Michael J. Striker

[57] ABSTRACT

A pair of infeed rollers located upstream of an exposure window and a pair of outfeed rollers downstream thereof transport an original across the exposure window so that successive portions of the transported original be imaged onto successive portions of copying medium whose transport speed corresponds to that of the original. The lower infeed and outfeed rollers are stationary, but the upper ones are located at the coupling links of a four-or five-link transmission mechanism comprised of cranks and rockers. A tension spring tightened by an electromagnet causes the upper infeed roller to move down and press against the lower infeed roller. Due to the transmission mechanism, variations in the thickness of an original transported between the infeed rollers inherently modified in a controlled manner the force of the upper outfeed roller against the lower and-/or the spacing of the upper outfeed roller from the lower, so that an original transported across the exposure window by the infeed rollers not collide with the outfeed rollers. Intermediate successive copying operations, the roller pairs open, so that an endless original, such as a computer print-out, can be reverse transported by a distance at least equal to the transport-direction length of the exposure window, to form upon successive sheets of copying medium successive images which adjoin to form a gapless image of the endless original.

23 Claims, 6 Drawing Figures

4,227,803

CONTINUOUS COPYING MACHINE

BACKGROUND OF THE INVENTION

The present invention concerns continuous copying machines, of the type which include pairs of transport rollers which transport an original across a slot-like exposure window in synchronism with the transport of copying medium through an imaging station at which the copying medium is exposed to a slot-like image of successive transversely extending zones of the transported original. Typically, such continuous copying machines are provided with a pair of infeed rollers upstream of the exposure window, and also a pair of outfeed rollers downstream of the exposure window. One roller of each such roller pair has its mounting shaft mounted on a stationary part of the machine, whereas the other roller of the roller pair is mounted for movement into and out of engagement with such first roller and when engaged therewith is pressed thereagainst by means of spring force or under the action of weights.

SUMMARY OF THE INVENTION

It is an object of the invention to provide a continuous copying machine with a transport-roller-pair transport system for originals, of the type set forth above, able to very reliably transport originals irrespective of whether the originals are extremely thin or rather thick.

It is a more particular object of the invention to assure that as an original is being transported across the exposure window by the infeed roller pair of the exposure window the leading edge of the original, especially if a thick original, when it arrives at the outfeed roller pair of the exposure window smoothly enter between the outfeed rollers and not impact against them in any manner which could interfere with smooth transport, e.g., which could interfere with proper copying exposure if a copying exposure is in process at the time of arrival of the original's leading edge at the outfeed rollers.

In the presently preferred embodiment of the invention, the mounting shafts of the movable ones of the infeed and outfeed rollers form the coupling links of a four-link transmission which includes, as a further link thereof, a coupling member which extends roughly parallel to the transport path for originals. The cranks of the four-link mechanism are inclined at an acute angle relative to the infeed direction for originals. The movable one of the infeed rollers is biased by a biasing force, serving to press the movable infeed roller against the stationary infeed roller, which biasing force is applied to the movable infeed roller in a direction approximately parallel to the cranks associated with such roller. Advantageously, the movable infeed roller is biased by at least one spring having a high spring factor so that, in response to thickness differences as between thin and thick originals, the amount of the resulting change in exerted spring force be quite considerable and on the order of magnitude of the normally applied roller-pressing force with which the movable infeed roller presses against the stationary infeed roller.

With this arrangement, the roller-pressing force with which the movable outfeed roller is pressed against the stationary outfeed roller is varied, due to the use of the four-link transmission mechanism, in automatic response to the thickness of the original transported between the two rollers of the infeed-roller pair. If a thicker original enters between the infeed rollers, the resulting increase in the infeed-roller roller-pressing force, through the intermediary of the four-link transmission mechanism, in turn results in a decrease in the force with which the movable outfeed roller is pressed against the stationary outfeed roller, or results in actual lifting of the movable outfeed roller from the stationary outfeed roller. By appropriate dimensioning and/or adjustment of the spring forces and spring lengths of the springs used to press the rollers of each roller pair together, and by appropriate orientation of the cranks which mount the movable infeed and outfeed rollers, the four-link transmission mechanism operates in such a way that for both thin originals, e.g., having a thickness of 1/100 mm, and likewise for thick originals, e.g., having a thickness of several tenths of a millimeter, the originals are very precisely engaged by both the infeed roller pair and the outfeed roller pair with, furthermore, an original whose leading end has passed the infeed roller pair then entering between the rollers of the outfeed roller pair smoothly and without an interfering collision with the rollers of the outfeed roller pair.

Furthermore, with the presently preferred multi-link transmission mechanism in question, the reduced pressing force exerted by the outfeed rollers return to its normal value at the moment when the trailing edge of the original has passed the infeed roller pair. In this way, in the case of thick and stiff originals such as could be transported across the exposure window by means of the infeed roller pair alone, such original can be transported across the exposure window by the infeed roller pair with the pressing force exerted by the outfeed roller pair greatly reduced, or even reduced to zero, and then, when the original has passed the infeed roller and transport can continue only by means of the outfeed roller pair, the outfeed rollers positively enough engaging the original for the continued transport, but now with restoration to a normal level of roller-pressing force or even an increased level of roller-pressing force during such final phase of transport.

In addition to the problem of collision of an original against the outfeed rollers, a source of diffulty involves such collision occurring against the infeed rollers. According to a further concept of the invention, the spring which presses the infeed rollers against each other is tightened by means of an electromagnet actuator. In this way, the infeed roller pair does not close until after the leading end of the original has entered between the rollers of such roller pair.

In principle, the springs which act on the movable infeed roller could engage the latter directly at the mounting shaft of such infeed roller, and in that case be at one end secured to a member mounted for adjusted displacement generally parallel to the direction of elongation of the cranks which mount such infeed roller. Preferably, however, the cranks which mount this infeed roller are mounted on rockers which extend generally perpendicular to such cranks, and the springs which apply roller-pressing force to the movable infeed roller engage such rockers. Return springs, which engage such cranks or rockers, cause the roller pair to open up again, by means of spring force exerted in direction opposite to that exerted by the roller-pressing springs, when the electromagnet for the latter is deactivated. In that event, a stop member is advantageously provided for limiting the range of motion of the aforementioned rockers as the latter are moving in the direction to open the infeed roller pair. With such especially preferred configuration for the transmission mechanism, the transmission is a five-link mechanism having two coupling members and two driven cranks mounted on stationary parts of the copying machine.

According to a further advantageous concept, the force-transmission path which extends from the electromagnet activator to the cranks includes a transmission lever whose pivot point is adjustably displaceable in a direction generally parallel to the direction in which roller-pressing force is transmitted by the transmission, with the point on the lever from which roller-pressing force is transmitted to the cranks and the point on the lever receiving roller-pressing force from the electromagnetic activator being different points. With this configuration, the roller-pressing force applied to the movable infeed roller can be very exactly adjusted both during manufacture of the mechanism and also during operation of the copying machine, despite the fact that the roller-pressing spring, whose spring factor is high for the purposes set forth above, experiences only small changes in its length during operation. This then makes it possible not to observe excessively exact tolerances during manufacture of the constituent components of the mechanism.

According to a further preferred concept of the invention, the roller-pressing spring for the movable infeed roller is constituted by a shaft which connects together the cranks which mount the movable infeed roller. A rocker is secured to such shaft midway between its ends and such rocker is pivotally displaced by means of an electromagnetic activator. This makes it possible, in a simple way, to incorporate into the transmission mechanism springs of exceedingly high spring factor, the aforementioned shaft acting as a spring by undergoing deformation in response to displacement of the just mentioned rocker. In addition or alternatively, the spring shaft to which such rocker is secured can be mounted at its ends in sides plates which are generally parallel to the direction of elongation of the cranks which mount the movable infeed roller.

According to a further concept of the invention, the electromagnetic activator which tightens the roller-pressing spring for the movable infeed roller is controlled in dependence upon the copying cycle of the copying machine. Additionally, a paper sensor, located between the infeed rollers and a paper stop member located downstream of the infeed rollers, controls the electromagnetic activator for the roller-pressing spring, and possibly also controls the copying cycle of the copying machine. The paper stop member is mounted on the mounting shaft of the movable infeed roller and swings into the transport path of originals. The paper stop member, either under the action of its own weight or under the action of a biasing spring, rests upon a portion of the transport path located laterally of originals, the paper stop member having a projection on which it thusly rests, such projection being located between the mounting shaft for the movable infeed roller and the paper stop edge of the stop member.

In this way, when the copying machine is in ready condition, the original need merely be pushed in between the somewhat opened infeed rollers until it comes to a stop at its leading end against the aforementioned paper stop edge of the stop member which has been swung into the transport path. When the thusly inserted original is sensed by a paper sensor located upstream of the paper stop edge, the infeed roller pair is automatically closed and the actual copying cycle of the machine is initiated. The stop edge of the paper stop member then inherently swings out of the transport path for originals, due to its pivotal mounting on the mounting shaft for the movable infeed roller, as the movable infeed roller is moved into engagement with the stationary infeed roller.

According to a further concept of the invention, the copying machine is provided with a user-operated copy switch, e.g., a pushbutton switch, which when operated by the user closes the transport rollers, e.g., the infeed roller pair, which are open intermediate successive copying cycles. Advantageously, operation of the copy switch additionally enables the aforementioned paper sensor, which latter in turn and as already stated actually initiates a copying cycle.

In this way, during the time intervals intermediate successive copying cycles either a normal sheet-like original or else an endless original (e.g., a very lengthy computer print-out) can be inserted between the opened transport rollers and pushed across the exposure window until the leading end of the part of the original actually to be copied reaches the leading end of the exposure window. Then, when the copy switch is operated the copying operation will start at this location on the original. This manner of operation is also possible when use is made of a paper sensor which initiates the actual copying operation, because such sensor will be triggered upon closing of the infeed rollers if an endless original is located in the vicinity of the transport rollers. Alternatively, it would also be possible to have the copy switch merely set the copying machine into ready condition (e.g., to initiate rotation of the machine's drum, if of the drum type). The copying operation then begins at the moment in which the leading edge of a original is fed into the infeed rollers.

According to a further concept of the invention, a control switch independent of the copy switch is operated by the user to open the transport rollers. Thus, when this control switch is pressed the transport roller pairs open immediately and the original can be manually removed from the machine in the event of a malfunction which might threaten the original. Additionally, such control switch could be operated to open the transport rollers to permit insertion and repeated backward shifting of an endless original.

According to a further concept of the invention, there is provided a control arrangement which, during the time interval between the end of a normal copying cycle and the next activation of the copy switch, connects the paper sensor with a means for opening the transport rollers. Advantageously, there is also provided means operative at the end of a normal copying cycle for transporting the original backwards a distance at least equal to the transport-direction length of the slot-like exposure window.

In this way, the transport rollers open up automatically upon completion of the copying cycle (whose duration is determined by the sheets of copy paper used by the machine) if a portion of the original is, at this time, still being sensed by the paper sensor. Accordingly, overlong originals, too, can be immediately removed from the copying machine upon completion of the copying operation. It is thereby also possible to copy successive portions of an endless original onto successive individual sheets of copy paper such that when the copy paper sheets are then placed side by side a gapless image of the endless original is formed. If the machine is to be operated in this way, then after each copying operation the automatically opened transport rollers permit manual or automatic backwards transport of the original by a distance at least equal to the transport-direction length of the exposure window. Accordingly, each new copying operation will start at just that location of the original at which the preceding copying operation had ended.

When, as presently preferred, the infeed roller pair is followed by an outfeed roller pair, then according to a further preferred concept of the invention operation of the aforementioned electromagnetic activating arrangement controlled by the copy switch controls a closing means for the outfeed roller pair and enables the aforementioned paper sensor, located downstream of the infeed roller pair. Advantageously, the copy switch controls a switch which effects closure of the infeed roller pair and provides a self-holding action to keep the infeed roller pair closed at least until such time as an inserted original will have had time to reach the location in the transport path at which the aforementioned paper sensor is located.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
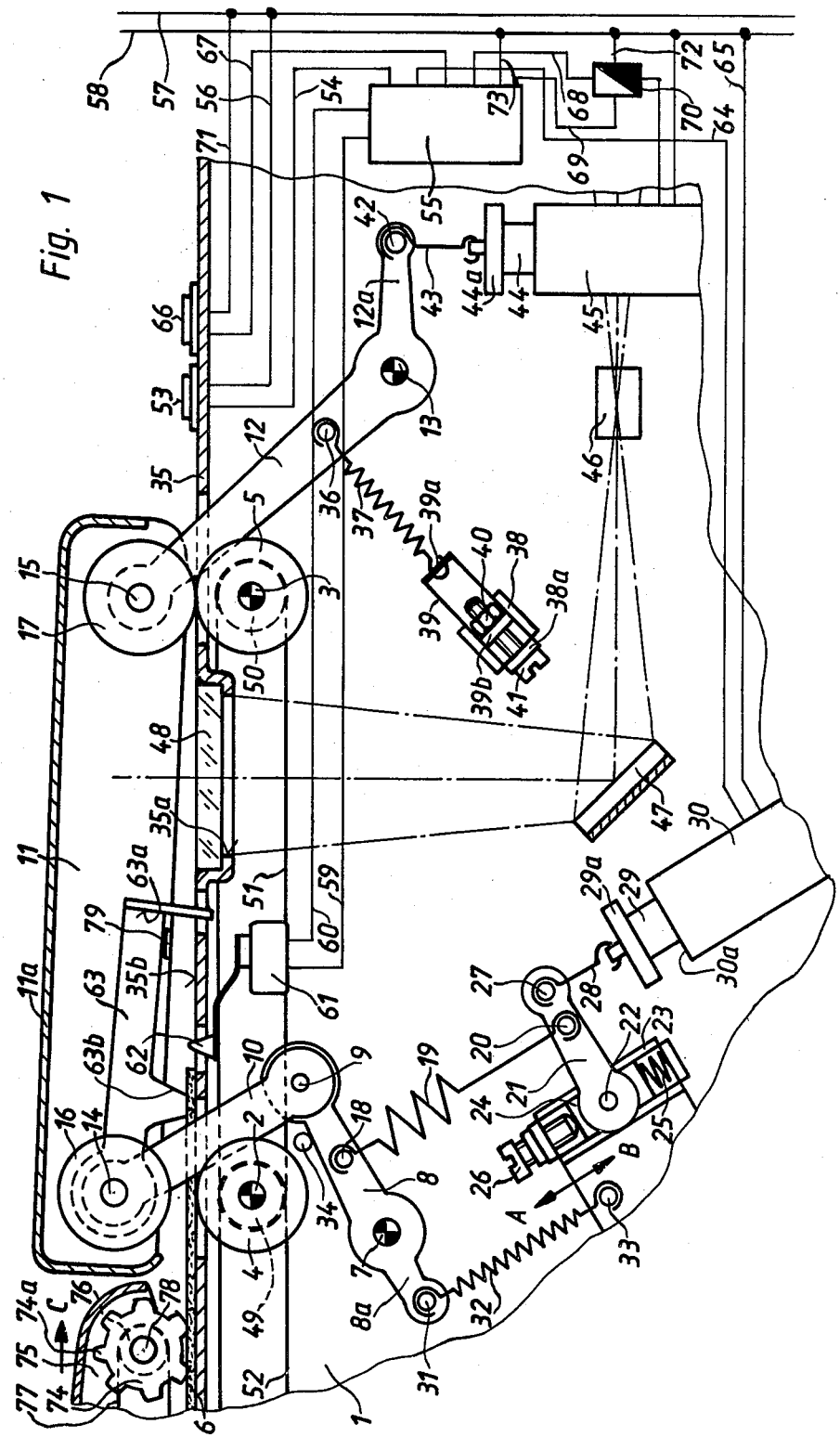
FIG. 1 is a vertical section taken through an exemplary but preferred embodiment of the present invention, the infeed and outfeed rollers of the transport system for originals being shown in the positions they occupy when the copying machine is in readiness for a copying cycle but a copying cycle has not yet been initiated.

In FIG. 1, numeral 1 denotes the framework of the illustrated copying machine. The shafts 2, 3 of a lower infeed roller 4 and of a lower outfeed roller 5 are mounted on stationary parts of the machine. Numeral 6 denotes an original to be copied. Numeral 7 denotes another stationary shaft, i.e., its ends mounted on stationary parts of the machine, on which are pivotally carried two rockers 8, only one shown in FIG. 1, the other being located behind the one illustrated. The right arms of the two rockers 8 mount the ends of a further shaft 9. Articulately coupled to shaft 9 is a four-link transmission comprised of two cranks 10 (only one visible in FIG. 1), a coupling member 11, and two cranks 12 (only one visible in FIG. 1). The cranks 12 are pivotally mounted on a stationary shaft 13. The coupling links of the four-link transmission are constituted by a shaft 14 and a shaft 15. Shaft 14 mounts an upper infeed roller 16, and shaft 15 mounts an upper outfeed roller 17. The coupling member 11 of the four-link transmission here has the form of a substantially closed housing for the swingably mounted rollers 16, 17, such housing being closed on its four sides and from above by a cover plate 11a.

Connected to a pin 18 on rocker 8 is one end of a tension spring 9 having a relatively high spring factor. The other end of tension spring 19 is connected to a pin 20 on a rocker 21. Rocker 21 rocks about a shaft 22. Shaft 22 is secured to a carriage 24 which is guided in a guide member 23. Carriage 24 is pressed by a compression spring 25 against an adjustment screw 26. In this way, the position of shaft 22 can be adjusted along the direction in which tension spring 19 pulls.

Rocker 21 has a further pin 27 to which is connected one end of a pull rod 28 whose other end is connected to the armature 29 of an electromagnet 30. Armature 29 is pulled into electromagnet 30 when the latter is energized. Pull armature 29 is provided with a collar 29a which, together with the upper face 30a of the housing of electromagnet 30, forms a fixed stop for the pull armature 29.

The left arm 8a of rocker 8 carries a pin 31 to which is connected one end of a tension spring 32 whose other end is secured to a stationary pin 33. Tension spring 32 urges rocker 8 counterclockwise against a stationary stop pin 34, until such time as spring 19 is stretched by means of electromagnet 29, 30. When this occurs, and because spring 19 is considerably stronger than spring 32, rocket 18 is pulled clockwise until the upper infeed roller 16 has come into pressing contact against an original 6, or against the periphery of lower infeed roller 4 located at the level of upper housing surface 35 which forms a guide path for the original.

Adjustment of adjustment screw 26 serves to displace the pivot shaft 22 of rocker 21 in the direction of arrows A-B, and thereby adjust the force with which tension spring 19 causes upper infeed roller 16 to be pressed down against lower infeed roller 4. Screw 26 can be so set that upper infeed roller begins to press down against lower infeed roller 4 with the rated pressure value for the rollers, just at the moment when, in the absence of an original 6 between the rollers, the upper rollers 16 comes into contact with the lower roller 4. The adjustment of the roller pressure is accomplished by shortening or lengthening the force transmission path between the electromagnet 29, 30 and the rocker 8, achieved by displacing the swing shaft 22 in the pull direction of spring 19 and thereby changing the relative positions, as considered along such direction, of the pins 20 and 27.

The spring factor of tension spring 19 is so selected that if a thick original enters beneath upper in feed roller 16 and thereby raises the latter, the resulting increase in the pressing force applied to roller 16 by spring 19 is of such an amount as to effect a requisite reduction in the pressing force exerted by upper outfeed roller 17, this pressing-force reduction being described in greater detail below.

The pressing force for upper outfeed roller 17 is produced by a tension spring 36 whose one end is fastened to a pin 36 on crank 12 and whose other end is fastened to a bent tab 39a on a lug 39. Lug 39 is guided for longitudinal displacement in a guide member 38. An adjustment bolt 41 extends through a bent tab 38a on guide member 38, through a further bent tab 39a on lug 39 and through a nut 40 located on the opposite side of tab 39b, and can be turned to adjust the pulling force of tension spring 37, making it possible to regulate the starting tension of spring 37.

Crank 12 is swung against the force of tension spring 37, so as to lift outfeed roller 17 of lower outfeed roller 5, by means of an electromagnet 45 whose pull armature 44 is connected via a pull link 43 to a pin on the right arm of crank 12. A collar 44a on pull armature 44 comes to rest against the stator of electromagnet 45 to define a fixed stop for armature 44. When electromagnet 44, 45 is energized, crank 12 is swung clockwise by an amount such that roller 17 lifts off roller 5; through the intermediary of coupling member 11, upper infeed roller 16, which is already raised off lower infeed roller 4, is raised further up; and projection 79 on coupling member 11 raises the paper stop edge 63a of a paper stop member 63 out of the transport path of the original, these latter elements described further below.

The upper housing surface 35, which forms part of a guide path for an original 6, is provided with an exposure window 35a. As an original 6 is transported across exposure window 35a, a projection optics 46 images a strip-like sector of the original onto a (non-illustrated) sheet or web of recording medium which is transported past the imaging station at a speed corresponding to the transport speed of original 6. Exposure window 35a accommodates a transparent support plate 48 which forms a continuation of the guide surface presented by upper housing surface 35. During transport of the original 6 across exposure window 35a, the lower rollers 4 and 5, whose shafts are mounted on stationary parts of the machine, are driven by means of cord pulleys 49, 50 around which are trained cord runs 51, 52. The original 6 is transported at the same speed as the (non-illustrated) sheet or web of copy medium is transported, in the case of 1:1 scale copying, or at a speed which takes into account whatever other scale of copying might be involved.

A copying operation is initiated by pressing a copy pushbutton switch 53 connected via a line 54 with a central control circuit 55. A further line 56 connects the copy switch 53 to conductor 57 which, along with conductor 58, is connected to a source of electrical power, e.g., a wall socket. Central control circuit 55 is connected via lines 59 and 60 to a microswitch 61 whose feeler 62 projects into the transport path of the original 6.

FIG. 1 depicts the relevant components of the machine in their initial positions and settings. In the illustrated starting condition of the machine, there projects into the transport path of original 6 the stop edge 63a of the aforementioned paper stop member 63, stop member 63 being pivotally mounted on shaft 14. Paper stop member 63 has a nose 63b which rests upon the upper housing surface 35a but is located laterally of the actual transport path of the original 6. In the illustrated starting condition, with upper infeed roller 16 in raised position, stop member 63 rests with its nose 63b upon upper housing surface 35, with the illustrated orientation. However, because nose 63b is located intermediate shaft 14 and stop edge 63a, when upper infeed roller 16 is subsequently lowered nose 63b acts like a fulcrum with the result that stop edge 63a swings upwards out of the transport path of original 6. Accordingly, stop edge 63a automatically removes itself from the transport path of the original when infeed roller 16 is lowered, i.e., when the infeed roller pair 4, 16 closes. Stop edge 63a also rises up out of the transport path, being lifted by a projection 79 on coupling member 11, when both of the upper rollers 16, 17 have been raised off their lower rollers 4, 5.

When copy switch 53 is pressed by the operator, central control circuit 55 readies the copying machine for operation, e.g., initiating operation of the transport means for the copy paper or copy web, and so forth. If now an original 6 enters below the raised upper infeed roller 16 and travels towards paper stop edge 63a, microswitch 61, 62 is activated and control circuit 55 initiates the copying cycle of the machine, this including energization of electromagnet 29, 30 via line 64 to cause the infeed roller pair 4, 16 to close. A further line 65 connects the winding of electromagnet 30 to operating-voltage conductor 58, so as to provide a complete current path for the electromagnet winding.

If during the course of copying, as the original travels through the exposure station of the machine, there develops a malfunction which might do damage to the original, the operator presses a further pushbutton switch 66 provided on upper housing part 35. Switch 66 is connected via a line 67 to control circuit 55, which responds to activation of switch 66 by effecting immediate opening of the two roller pairs 4, 16 and 5, 17. In particular, when switch 66 is pressed by the operator, control circuit 55 energizes electromagnet 44, 45 via a control line 68 in which is connected a self-holding relay 70. As a result, electromagnet 44, 45 causes the two cranks 12 to be swung clockwise against the force of tension spring 37, thereby lifting upper outfeed roller 17 off of lower infeed roller 5, and also moving upper roller 17 rightwards relative to its position in FIG. 1. The rightwards displacement of roller 17 is transmitted via coupling member 11 to the mounting shaft 14, as a result of which the cranks 10 are likewise swung clockwise, thereby lifting upper infeed roller 16 off of lower infeed roller 4. To provide complete current paths, switch 66 and self-holding relay 70 are connected via lines 71 and 72 to operating-voltage line 58. A further line 73 connects the control circuit 55 to operating voltage line 58. A line 69 connecting control circuit 55 to self-holding relay 70 forms part of the self-holding current path of relay 70. The self-holding action of relay 70 terminates when the operator again presses copy switch 53.

When both the infeed roller pair and the outfeed roller pair are opened in this way, this serves to protect the original against damage, and furthermore permits quick manual removal of the original. With both the infeed and outfeed roller pairs open in this way, it is also possible to feed an endless original (e.g., a long computer print-out) beneath the raised transport rollers 16, 17 until such time as the portion of such original actually to be copied has been brought to a location somewhat upstream of the exposure window 35a.

If the transport rollers 16, 17 are in raised position and the operator again presses copy switch 53, these rollers are lowered again, and the next copying cycle of the machine is initiated when microswitch 61, 62 senses a transported original.

If the original 6 is an endless original (e.g., a lengthy computer print-out) and, upon completion of the copying cycle, the microswitch 61, 62 continues to sense the presence of such orignal, then control circuit 55 commands that the upper infeed and outfeed rollers 16, 17 be swung up to raised position. The udration of the copying cycle of the machine is ordinarily matched to the transport-direction length of the sheets of copying paper or copying medium employed. With the infeed and outfeed roller pairs 4, 16 and 5, 17 now in open condition, the operator can manually shift the original in the direction opposite to transport direction C by an amount equal to the transport-direction length of exposure window 35a, and then again press the copy switch 53, so that continued copying of the original during such new copying cycle pick up from that point on the original last copied during the preceding copying cycle. What is then produced are copy sheets which if placed end to end form a gapless image of the endless original.

To avoid the need for manual backspacing of the endless original such as just described, the illustrated embodiment includes a device for automatically effecting such backspacing. This device includes a sprocket-type transport wheel 74 whose mounting shaft 78 is mounted on a swingable arm 75. The sprockets 74a of transport wheel 74 engage perforations provided in the endless original, e.g., the usual perforations running alongside the edge of a computer print-out. Transport wheel 74 is driven by a drive wheel 76 in turn driven by a drive belt 77 by means of a (non-illustrated) transport motor controlled by control circuit 55. When, in the manner just described, microswitch 61, 62 senses the continued presence of an original upon completion of one copying cycle, control circuit 55, in addition to commanding the raising of rollers 16, 17, activates the drive for transport wheel 74a to cause the latter to feed the lengthy original backwards a distance equal to the transport-direction length of exposure window 35a.

Figure 2:
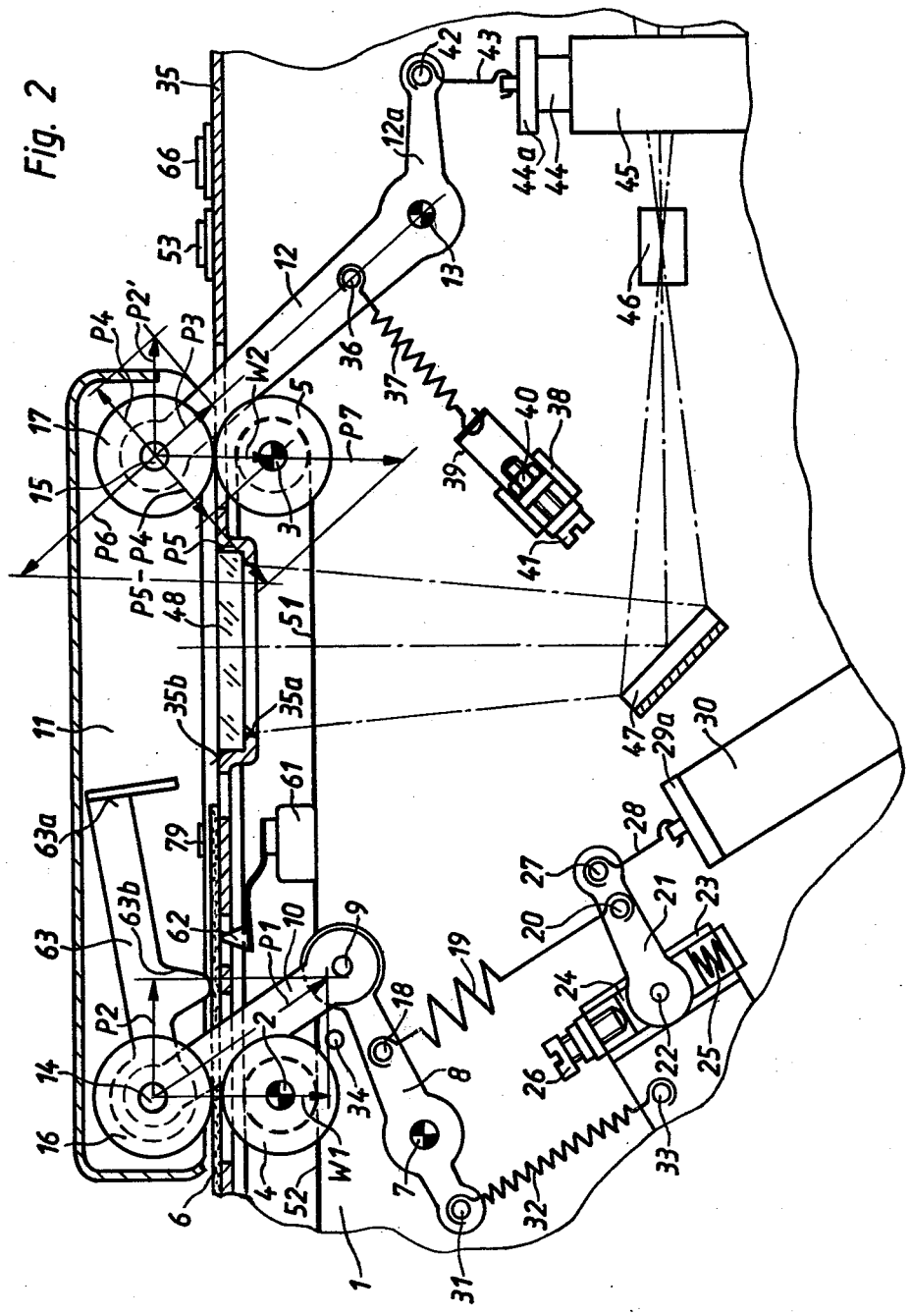
FIG. 2 depicts the embodiment of FIG. 1, but with the infeed and outfeed rollers closed.

In FIG. 2, both the infeed roller pair 4, 16 and the outfeed roller pair 5, 17 are shown in closed position. The pull armature 29 of electromagnet 30 is pulled in all the way to its stop, whereas electromagnet 44, 45 is in unenergized state. Due to the stretching of tension spring 19 by electromagnet 29, 30, the crank 10 pulls upon the upper infeed roller 16 with a force $P_1$ oriented parallel to the elongation of crank 10. Force $P_1$ consists of a roller-pressure force component $W_1$ which acts perpendicular to the support surface 35 for original 6 and serves as such to press upper infeed roller 17 down against lower infeed roller 5, and also a displacement force component $P_2$ oriented parallel to the support surface 35. Coupling member 11 transmits the just mentioned displacement force $P_2$ to the upper outfeed roller 17 as a displacement force $P_2'$ of magnitude equal to $P_2$. Displacement force $P_2'$ consists of a component $P_3$ which extends in the direction of elongation of the cranks 12, downwardly directed, and a component $P_4$ which extends perpendicular to such direction, and upwardly directed. Tension spring 37 exerts upon crank 12 and thereby upon upper outfeed roller 17 a force $P_5$ opposite in direction to force component $P_4$. Force $P_5$ consists of a component $P_6$ oriented parallel to the elongation of crank 12 and upwardly directed, and also a force component $P_7$ oriented downwards and normal to the support surface 35 for original 6. Due to the opposite directions of action of forces $P_4$ and $P_5$ the actually effective roller pressing force pressing roller 17 downwards in direction normal to support surface 35 is $W_2$ as indicated in FIG. 2.

Figure 3:
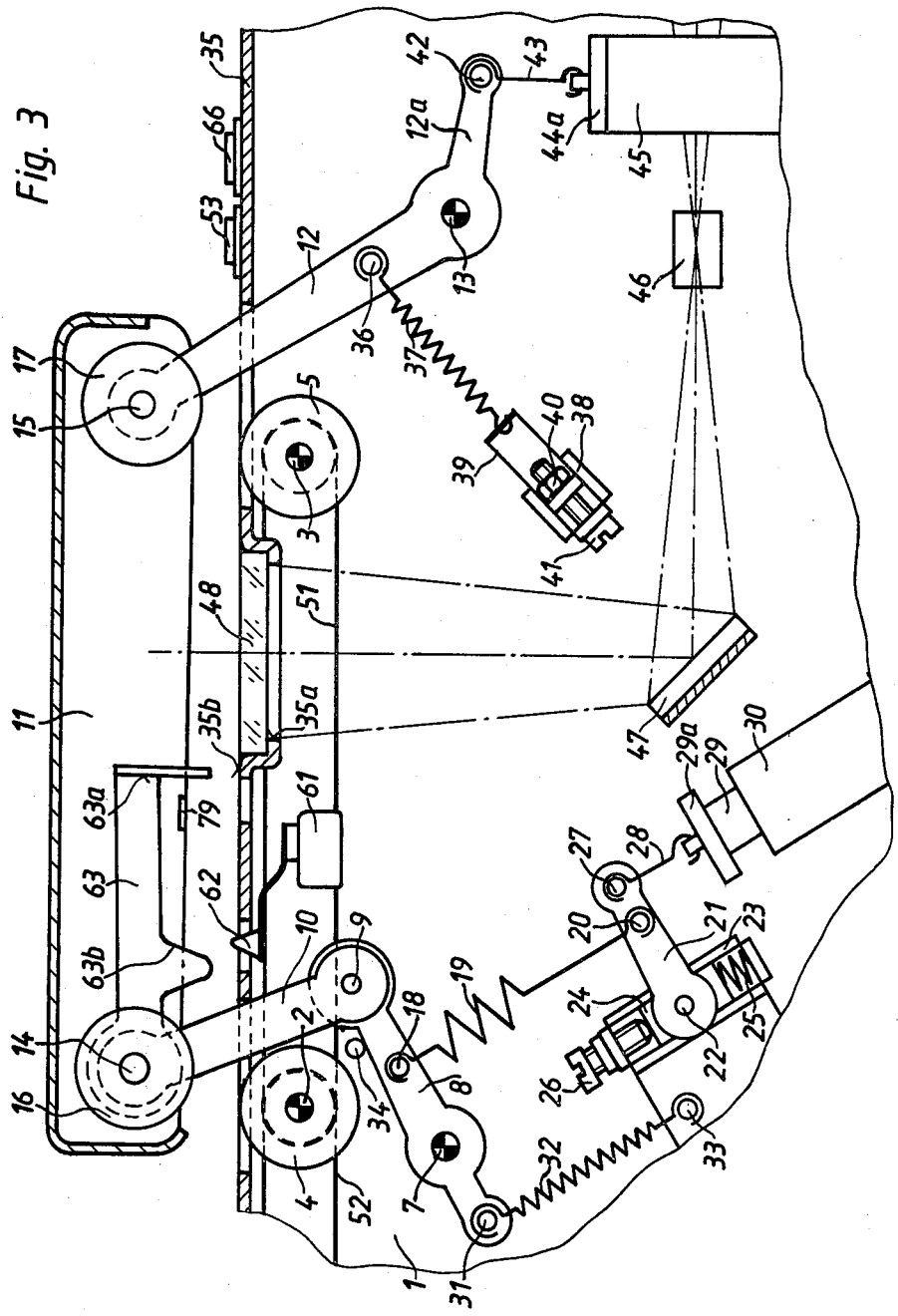
FIG. 3 depicts the infeed and outfeed rollers open.

FIG. 3 depicts the infeed roller pair 4, 16 and the outfeed roller pair 5, 17 both in open condition. Electromagnet 29, 30 is unenergized and accordingly spring 19 unstretched. The pull armature 44 of electromagnet 45 is pulled fully into the electromagnet. As a result, the cranks 12 have been swung clockwise, thereby lifting outfeed roller 17 off outfeed roller 5, and via coupling member 11, lifting infeed roller 16 off infeed roller 4. Also, the projection 79 on coupling member 11 keeps the paper stop edge 63a at a height out of the transport path for originals, for example so that an endless original can be freely shifted by the operator across exposure window 35a.

Figure 6:
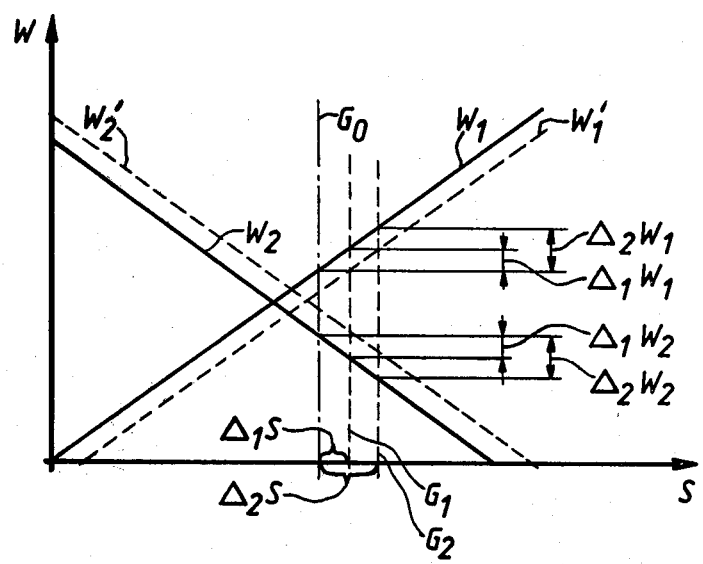
FIG. 6 is a diagram dipicting the interdependence between the roller-pressing force applied to the infeed rollers and that applied to the outfeed rollers as well as the dependence of these forces upon the thickness of the original being transported.

FIG. 6 depicts the dependence of the infeed roller pressing force $W_1$ and of the outfeed roller pressing force $W_2$ upon variations in the length S of tension spring 19, in turn corresponding to variations in the thickness of originals 6 fed through the machine. The location of dash-dot line $G_0$ along the S (spring length) axis indicates the length of tension spring 19 when no original 6 is present and the upper transport rollers are bearing down directly upon the surfaces of the lower transport rollers. In this situation, the two roller pressing forces $W_1$ and $W_2$ (determined by the intersections of lines $W_1k$ $W_2$ with line $G_0$) are roughly equal to each other. The adjustment bolts 26 and 41 of FIG. 1 can be so set that the roller pressing forces $W_1$, $W_2$ vary in correspondence to the oppositely sloped inclined lines $W_1$, $W_2$ of FIG. 6. Alternatively, these bolts can be so adjusted as to instead implement the broken lines $W_1$, and $W_2$, of FIG. 1, as a result of which the infeed and outfeed roller pressing forces which exist in the absence of an original would be altered in the manner depicted. However, broken lines $W_1k$ and $W_2$, will be ignored, and instead consideration given to what happens when, for the adjustment-bolt settings associated with the solid lines $W_1$, $W_2$, the length of tension spring 19 varies due to variation in the thickness of originals transported between the upper and lower rollers.

Assume, now, that a thin original enters between the infeed rollers 4, 16, slightly lifting roller 16 and thereby slightly increasing the length S of spring 19, i.e., by an amount $\Delta_1 S$, to a new length $G_1$. As a result, the infeed-roller pressing force $W_1$ increases by an increment of $\Delta_1 W_1$. As a result of this latter increase, there occurs an automatic decrease of the outfeed-roller pressing force $W_2$ by a decrement of $\Delta_1 W_2$, corresponding to the increment $\Delta_1 W_1$.

If, instead, a thicker sheet enters between the upper and lower transport rollers, the length of spring 19 increases to value $G_2$, and the roller-pressing forces $W_1$ and $W_2$ respectively increase and decrease by greater amounts $\Delta_2 W_1$ and $\Delta_2 W_2$. The outfeed-roller pressing force $W_2$ accordingly shifts more towards zero and, as will be appreciated from FIG. 6, could even shift below zero towards negative (upwards directed) values in the case of a sufficiently thick original. I.e., for thicknesses of originals beginning with a certain value, outfeed roller 17 begins to lift off outfeed roller 5 even before such original actually reaches the outfeed rollers, and for yet thicker originals outfeed roller 17 does not come into force equilibrium except at a position spaced a certain amount above lower outfeed roller 5, if the initial length of spring 19 and the initial directions in which the cranks extend have been properly selected.

The graph of FIG. 6 corresponds to the case in which both the cranks 10 and the cranks 12 are oriented at angles of 45°. For other angles of orientation relationships of the same character as depicted in FIG. 6 result; e.g., the roller pressing force $W_2$, reduced by the amount $\Delta W_2$, would no longer lie on the starting line $W_2$.

In FIG. 6 the relationships are depicted for the case where the cranks 10 and 12 are acted upon by the springs 19 and 37. It will be understood, however, that spring force could be wholly or in part replaced by the use of weights operative, due to gravity, for developing similar roller pressing forces, with the force resulting from such weights, whether in combination with spring force or not, being applied either in the direction perpendicular to the direction of the cranks 12 or perpendicular to the support surface 35 for originals.

Figure 4:
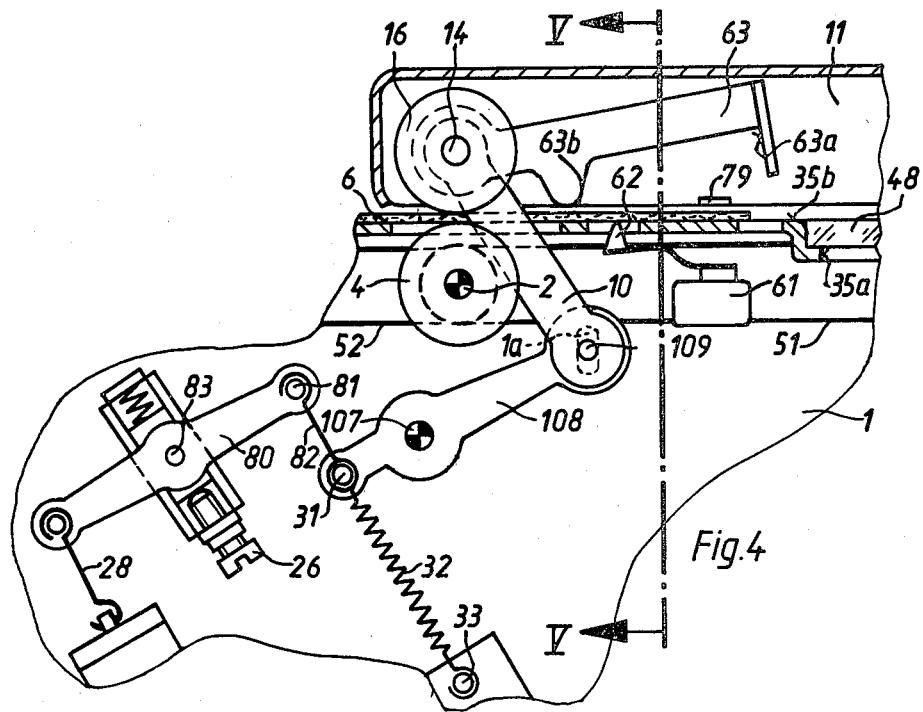
FIG. 4 depicts an alternative embodiment for the means for applying roller-pressing force to the movable one of the infeed rollers.
Figure 5:
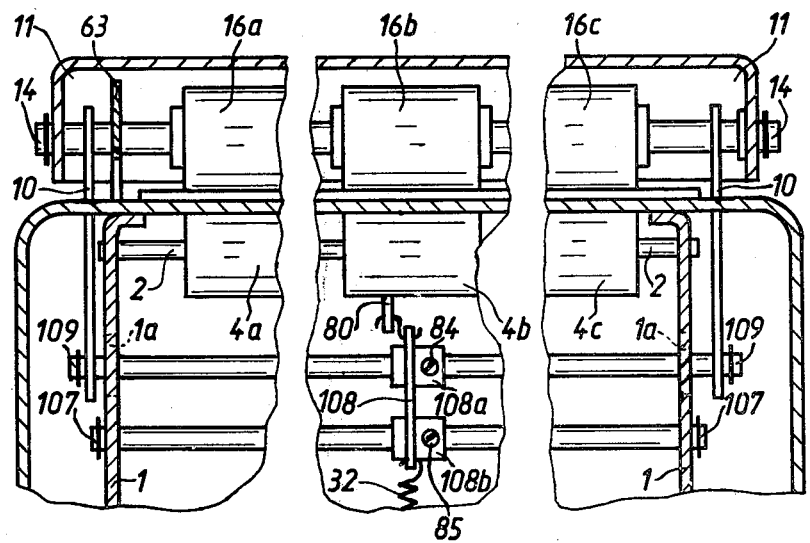
FIG. 5 is a section taken along line V—V of FIG. 4.

In the embodiment depicted in FIGS. 4 and 5, the rocker 8, to which the crank 10 for the upper infeed roller 16 is articulately coupled, is connected by means of a pull link 82 to a pin 81 provided on a swing lever 80. The pull link 28 for the electromagnet which stretches the tension spring 32 for upper roller 16 is connected to the left arm of rocker 80. In this instance, the adjustment bolt 26 serves to permit adjustment of the location of the pivot shaft 83 of rocker 80.

As shown in FIG. 5, the swing lever 108 is mounted by means of sleeves 108a, 108b and set screws 84, 85 about midway between the ends of shafts 107, 109, which latter extend across substantially the whole breadth of the roller arrangement. The two ends of shaft 107 are mounted stationary in support walls 1, whereas the two ends of shaft 109 are mounted in vertical slots 1a of support walls 1. The distance between the two shafts 107 and 109, measured exclusively in the horizontal direction, is fixed. However, the distance between shafts 107 and 109 measured in the direction in which they are spaced from each other, i.e., along the length of swing lever 108, changes depending upon whether the ends of shaft 109 are located at the upper part or the lower part of the vertical mounting slots 1a. Accordingly, to vertically displace shaft 109 it is necessary to bring the two shafts 108, 109 closer to each other or move them farther from each other, in the vicinity midway between their ends where swing lever 108 is mounted. Because these shafts 108 and 109 are lengthy, they can bend to an extent sufficient for such displacement. On the other hand, in so bending they act as an extremely strong spring having a very high spring factor, i.e., providing a spring force which increases very considerably with each increment of displacement of shaft 109. Accordingly, in this embodiment, the bending of the two shafts 107, 109 serves to provide the roller pressing force provided by spring 19 in FIG. 1. In this embodiment, the upper and lower infeed rollers 16 and 4 are each comprised of a row of axially spaced rollers 16a, 16b, 16c and 4a, 4b, 4c each mounted on their respective shafts 14 and 2.

In the embodiments described above, the pressing force exerted by the upper outfeed roller upon the lower outfeed roller, and/or the spacing of the upper outfeed roller from the lower, outfeed roller is automatically varied, by the four-link linkage described above, in response to the thickness of the original passing between the two infeed rollers, so as to make possible the various modes of operation and corrective capabilities set forth above, including, as explained above, the opening of the outfeed rollers to an extent such that an original transported between the closed infeed rollers will not experience a disturbance or interference in its transport as it reaches the outfeed rollers. It will be understood, however, that the particular four-link transmission disclosed herein, although presently more preferred, is exemplary and that other functionality equivalent linkages and transmissions, e.g., a fire-link linkage instead of a four-link linkage, could also be employed.

Likewise, although the use of such four-link transmission does bring with it certain capabilities discussed above, in so far as the modes of operation involving an endless original are concerned it is not absolutely necessary to use one infeed roller pair upstream of the exposure window and one outfeed roller pair downstream thereof; for example, the outfeed roller pair might be eliminated, or use might be made of more than one infeed roller pair and/or more than one outfeed roller pair with the various roller pairs being controlled by separate respective rockers not all intercoupled via a parallelogram or other such linkage. This is said with regard to modes of operation involving endless originals.

It will be understood that each of the elements described above, or two or more together, may also find a useful application in other types of constructions and modes of operation, differing from the types described above.

While the invention has been illustrated and described as embodied in the context of certain types of copying machines having specified combinations of capabilities, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a continuous copying machine of the type in which an original is transported across an exposure window for imaging of successive portions of the transported original upon successive portions of a copy medium transported at a speed corresponding to the transport speed of the original, in combination, a pair of infeed rollers located upstream of the exposure window, including stationary mounting means mounting one infeed roller, the other infeed roller being movable; a pair of outfeed rollers located downstream of the exposure window, mounting one outfeed roller, the other outfeed roller being movable; a multi-link linkage mechanism mounting the movable infeed roller and the movable outfeed roller for interdependent movement into and out of engagement with the stationary infeed roller and the stationary outfeel roller, respectively; and means for applying to the movable rollers through the intermediary of the multi-link linkage mechanism a roller pressing force pressing them against the stationary rollers.

2. In a copying machine as defined in claim 1, the multi-link linkage mechanism including infeed-roller cranks extending from the rotation axis of the movable infeed roller and movably mounting the movable infeed roller, outfeed-roller cranks extending from the rotation axis of the movable outfeed roller and movably mounting the movable outfeed roller, and a coupling member extending from the rotation axis of the movable infeed roller to that of the movable outfeed roller, the means applying the roller pressing force including means for applying to the infeed roller a roller pressing force oriented generally parallel to the direction in which the infeed-roller cranks extend.

3. In a copying machine as defined in claim 2, the means apply to the infeed roller a roller pressing force oriented generally parallel to the direction in which the infeed-roller cranks extend including a roller-pressing spring having a spring factor so high that variations in the spacing of the movable infeed roller from the stationary infeed roller resulting from mere variation in the thickness of originals transported between the infeed rollers results in variation of the roller-pressing force applied by said spring on the order of magnitude of the roller-pressing force itself.

4. In a copying machine as defined in claim 3, the means applying the roller pressing force to the infeed roller furthermore including electromagnetic activator means connected to the spring and operative when activated for tightening the roller-pressing spring.

5. In a copying machine as defined in claim 2, the infeed-roller cranks mounting the movable infeed roller at one end of the infeed-roller cranks, the multi-link linkage mechanism furthermore including infeed-roller rockers having ends pivotally connected to the other ends of the infeed-roller cranks, the infeed-roller rockers extending generally perpendicular to the infeed-roller cranks, the means for applying roller pressing force including spring means connected to the infeed-roller rockers for applying thereto a force pressing the movable infeed roller against the stationary infeed roller.

6. In a copying machine as defined in claim 4, furthermore including at least one return spring operative for applying to the movable infeed roller a force urging the movable infeed roller away from the stationary infeed roller when the electromagnetic activator means has not tightened the roller-pressing spring.

7. In a copying machine as defined in claim 5, furthermore including a stop member positioned to limit the range of movement of at least one of the infeed-roller rockers when the latter moves in a direction causing the movable infeed roller to move away from the stationary infeed roller.

8. In a copying machine as defined in claim 4, the multi-link linkage mechanism furthermore including a transmission lever having a pivot axis, the roller-pressing spring being connected to the transmission lever at one distance from the pivot axis, the electromagnetic activator means tightening the roller-pressing spring through the intermediary of the transmission lever and being connected to the transmission lever at a different distance from the pivot axis.

9. In a copying machine as defined in claim 2, the means for applying a roller pressing force to the movable infeed roller including a shaft which connects together the infeed-roller cranks, a rocker secured to the shaft midway between the ends of the shaft, and electromagnetic activating means operative when activated for displacing the rocker and deforming the shaft, whereby the shaft acts as an extremely strong spring.

10. In a copying machine as defined in claim 9, the means for applying a roller pressing force furthermore including side plates mounting respective ends of the shaft and located in general planes which are generally parallel to the planes in which the infeed-roller cranks move.

11. In a copying machine as defined in claim 4, furthermore including means for activating the electromagnetic activator means in dependence upon the copying operation performed by the copying machine.

12. In a copying machine as defined in claim 4, furthermore including a paper stop member downstream of the infeed rollers but upstream of the exposure window, and a paper sensor located intermediate the infeed rollers and the paper stop member and operative for sensing the presence of an original, and means operative for activating the electromagnetic activator means and thereby tightening the roller-pressing spring in response to sensing of an original by the paper sensor.

13. In a copying machine as defined in claim 2, furthermore including a paper stop member pivotally connected to the linkage mechanism and having a paper stop edge located remote from its pivot axis, the paper stop member having a projection which rests on the copying machine alongside transported originals so located that when the movable infeed roller is moved into engagement with the stationary infeed roller the paper stop edge moves out of the transport path for originals but moves into the transport path when the movable infeed roller is moved away from the stationary infeed roller.

14. In a continuous copying machine of the type in which an original is transported across an exposure window for imaging of successive portions of the transported original upon successive portions of a copy medium transported at a speed corresponding to the transport speed of the original, in combination, a pair of transport rollers operative when in engagement with each other for transporting an original located between them across the exposure window, at least one of the transport rollers being movable towards and away from the other transport roller; a user-operated copy switch for commanding operation of the machine; means causing the movable transport roller to move away from the other transport roller during intervals intermediate successive copying operations performed by the copying machine; and means responding to operation of the copy switch by causing the movable transport roller to move into engagement with the other transport roller, whereby to effect transport of an original located between the two transport rollers.

15. In a copying machine as defined in claim 14, the means responding to operation of the copy switch including a paper sensor operative for sensing the presence of an original in the transport path of originals transported by the transport rollers and initiating copying operation by the copying machine in response to a sensed original when the copy switch has been operated.

16. In a copying machine as defined in claim 14, furthermore including a user-operated roller-open switch for commanding that the at least one movable transport roller move away from the other transport roller and means responding to operation of the roller-open switch by causing the movable transport roller to move away from the other roller, thereby opening up the pair of transport rollers.

17. In a copying machine as defined in claim 14, furthermore including a paper sensor located downstream of the transport rollers and upstream of the exposure window and operative upon completion of a copying operation performed by the copying machine for causing the movable transport roller to move away from the other transport roller if the presence of an original is sensed by the paper sensor.

18. In a copying machine as defined in claim 14, furthermore including reverse transport means operative for reversing the direction of transport of the original and transporting the original in reverse direction by a distance at least equal to the transport-direction length of the exposure window upon completion of a copying operation.

19. In a copying machine as defined in claim 14, furthermore including a paper sensor located upstream of the exposure window for sensing the presence of an original, and means operative upon completion of a copying operation for effecting reverse transport of an original by a distance at least equal to the transport-direction length of the exposure window if the presence of an original is sensed by the paper sensor.

20. In a copying machine as defined in claim 14, said pair of transport rollers being a pair of infeed rollers located upstream of the exposure window, furthermore including a pair of outfeed rollers located downstream of the exposure window and means responding to operation of the copy switch by closing the outfeed rollers.

21. In a copying machine as defined in claim 14, furthermore including a sensor located downstream of the pair of transport rollers and upstream of the exposure window, and means responding to operation of the copy switch by causing the movable transport roller to move into engagement with the other transport roller, and thereby transport an original located between the transport rollers, at least until such original reaches the sensor.

22. In a copying machine as defined in claim 14, the pair of transport rollers being a pair of infeed rollers located upstream of the exposure window, furthermore including a pair of outfeed rollers located downstream of the exposure window, at least one of the pair of outfeed rollers being movable towards and away from the other outfeed roller, a multi-link linkage mechanism mounting the movable infeed roller and the movable outfeed roller for movement towards and away from the other infeed roller and the other outfeed roller, respectively, the multi-link linkage mechanism including infeed-roller cranks mounted to pivot about a stationary pivot and connected to the movable infeed roller, outfeed-roller cranks mounted to pivot about a stationary pivot and connected to the movable outfeed roller, first means connected to the linkage mechanism and operative when activated for performing a longer-distance movement causing the movable infeed and outfeed rollers to move away from the other infeed and outfeed rollers and second means connected to the linkage mechanism and operative when acitvated for performing a shorter-distance movement causing the movable infeed roller to move into engagement with the other infeed roller.

23. A method of operating a continuous copying machine, the copying machine being of the type in which an original is transported across an exposure window for imaging of successive portions of the transported original onto successive portions of a copy medium transported at a speed corresponding to the transport speed of the original, the method comprising transporting a lengthy original in forwards direction across the exposure window to effect copying of a limited section of the original upon a sheet of copying medium, and then transporting the original in the opposite direction by a distance at least equal to the transport-direction length of the exposure window, and then transporting the original once again in forwards direction across the exposure window to effect copying of the next limited section of the original.

* * * * *

UNITED STATES PATENT AND TRADEMARK OFFICE
CERTIFICATE OF CORRECTION

PATENT NO. : 4,227,803

DATED : October 14, 1980

INVENTOR(S) : Hans A. Massengeil et al.

It is certified that error appears in the above-identified patent and that said Letters Patent are hereby corrected as shown below:

In the heading, the filing date of each of the German applications 2843521 and 2843522 should read:

October 5, 1978

Signed and Sealed this

Second Day of February 1982

[SEAL]

Attest:

GERALD J. MOSSINGHOFF

Attesting Officer    Commissioner of Patents and Trademarks